United States Patent
Meduri et al.

(10) Patent No.: US 7,519,977 B2
(45) Date of Patent: Apr. 14, 2009

(54) SYSTEM AND METHOD FOR ASYNCHRONOUSLY INVOKING DYNAMIC PROXY INTERFACE USING SUPPLEMENTAL INTERFACES

(75) Inventors: Subbarao K. Meduri, Apex, NC (US); Stephen M. Fontes, Fuquay-Varina, NC (US); William T. Newport, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 10/873,962

(22) Filed: Jun. 22, 2004

(65) Prior Publication Data

US 2005/0283517 A1 Dec. 22, 2005

(51) Int. Cl.
*G06F 13/00* (2006.01)
(52) U.S. Cl. .................. 719/330; 709/201; 709/217
(58) Field of Classification Search .................. 719/330, 719/331; 709/201, 217
See application file for complete search history.

(56) References Cited

U.S. PATENT DOCUMENTS

| | | | |
|---|---|---|---|
| 6,988,273 B2* | 1/2006 | Matula et al. | 719/316 |
| 7,000,238 B2* | 2/2006 | Nadler et al. | 719/330 |
| 2002/0165928 A1 | 11/2002 | Landfeldt et al. | |
| 2003/0005181 A1 | 1/2003 | Bau, III et al. | |
| 2003/0069969 A1 | 4/2003 | Renaud | |
| 2003/0070006 A1* | 4/2003 | Nadler et al. | 709/330 |
| 2003/0149801 A1* | 8/2003 | Kushnirskiy | 709/328 |
| 2003/0200332 A1 | 10/2003 | Gupta et al. | |
| 2004/0143835 A1* | 7/2004 | Dattke et al. | 719/315 |
| 2005/0081216 A1* | 4/2005 | Taylor | 719/315 |

* cited by examiner

Primary Examiner—Andy Ho
(74) Attorney, Agent, or Firm—Yee & Associates, P.C.; A. Bruce Clay

(57) ABSTRACT

In a Java-based environment, a dynamic proxy runtime provides a client with the ability to asynchronously invoke an interface method, thereby unblocking the client and allowing it to perform other tasks while waiting for results to be returned from the runtime. The original interface is not redefined nor is the real target object implementation modified. Rather, the runtime defines rules which the client employs to define an additional asynchronous interface to supplement the original interface.

13 Claims, 4 Drawing Sheets

Asynchronous Invocation Model

Synchronous Invocation Model

Asynchronous Invocation Model

SYSTEM AND METHOD FOR ASYNCHRONOUSLY INVOKING DYNAMIC PROXY INTERFACE USING SUPPLEMENTAL INTERFACES

TECHNICAL FIELD

The present invention relates generally to computer programming and, in particular, to invoking asynchronous dynamic proxies in a Java runtime environment by a client without redefining an original interface.

BACKGROUND ART

As is well known, Java™ is an object-oriented programming environment developed and distributed by Sun Microsystems. Java is capable of generating applications which may be executed on any Java-enabled platform. In the Java environment, a proxy is an object which acts as a surrogate for the underlying ("real") object and filters or modifies messages from the client before forwarding them to the real object. The proxy is typically transparent to the client by implementing interfaces of the real object. In early versions of Java, proxies were defined only by programming convention and fixed at compile time. However, a recent release of Java, version 1.3, introduced the Dynamic Proxy API through which proxy classes and objects may instead be assembled and dynamically reconfigured "on-the-fly" at runtime.

As illustrated in FIG. 1, an invocation of a dynamic proxy method is a synchronous method call. A client 10 requests that the runtime 20 create a dynamic proxy for a real interface (step 100). The runtime creates (step 102) and returns (step 104) the dynamic proxy. When the client 10 invokes a method on the proxy object (step 106), the runtime invokes the method on the target object 30 (step 108). Upon completion of the method, the target object 30 returns the results (step 110) to the runtime 20 which returns the results to the client (step 112). Until the results are returned to the client 10, the client 10 is effectively blocked from further activities, including additional calls to the runtime 20.

The following is an exemplary coding of the creation and invoking of a synchronous proxy interface:

```
Service Interface:
    public interface originalInterface {
        public void getValue( );
        public void foo( ) throws Exception;
    }
Target Object implements this interface for clients to invoke.
A Client invokes method of a target object as following:
    // synchronous case (client-side code)
    [normal case as described in Java 1.3]
    OriginalInterface proxy = (OriginalInterface)
        Proxy.newProxyInstance(classLoader, OriginalInterface.class,
            invocationHandler);
    int value = proxy.getValue( );
```

A technique has been developed for asynchronously invoking a method call, thereby allowing the client 10 to perform other activities until the call is returned. Such a technique, however, requires redefining the original interface to support asynchronous invocation. Thus, both the client and real object implementations must be changed. Consequently, a need remains for a technique to efficiently and dynamically invoke methods asynchronously.

SUMMARY OF THE INVENTION

In the present invention, a dynamic proxy runtime provides a client with the ability to asynchronously invoke an interface method. The runtime defines rules which the client employs to define an additional asynchronous interface to supplement the original interface. The rules include an asynchronous interface naming protocol whereby a new interface name is derived from the original interface name, such as by adding a predetermined keyword to the original interface name. The rules further include a system for changing the interface method signature to allow the runtime to return a handle to the client. And, the rules further include a packaging protocol whereby the client defines the new class in the same package as the original interface and makes it available in the classloader's classpath.

In contrast to other methods, the original interface is not redefined and the real target object implementation is not modified. As a result of the resulting asynchronous operation, the client is unblocked after calling the proxy, allowing it to perform other tasks while waiting for results to be returned from the runtime.

DETAILED DESCRIPTION OF THE PREFERRED EMBODIMENT

Figure 1:
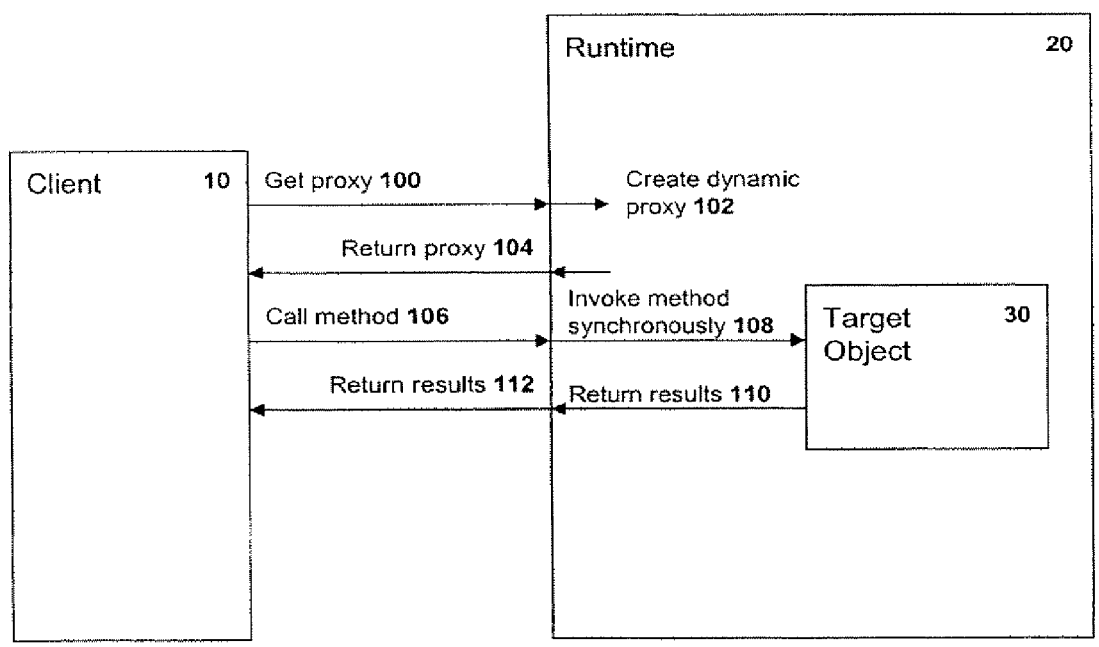
FIG. 1 is a process diagram of a synchronous method call.
Figure 2:
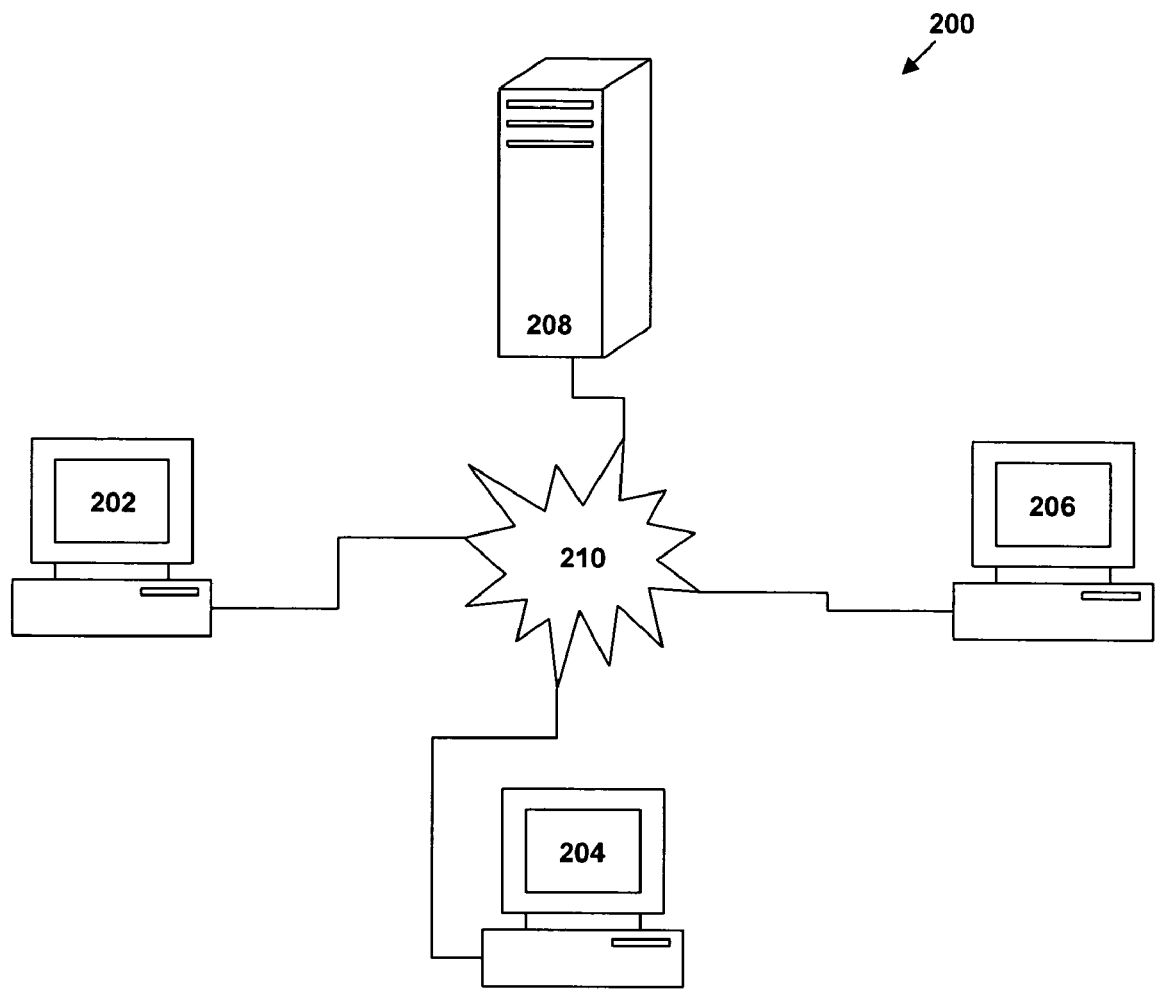
FIG. 2 is a block diagram of a Java environment in which the present invention may be implemented.

FIG. 2 is a block diagram of an exemplary Java environment 200 in which the present invention may be implemented. One or more client computers 202, 204, 206 are interconnected with a server 208 through a network 210. The computers 202, 204, 206 are Java-enabled but do not need to run under the same operating system or be otherwise compatible with each other. It will also be appreciated that the present invention may be implemented on any stand-alone Java-enabled computer or may be implemented on a Java-enabled computer 202, 204, 206 interconnected directly with the server. The network 210 provides additional convenience and flexibility but is not necessary for the practice of the present invention.

Figure 3:
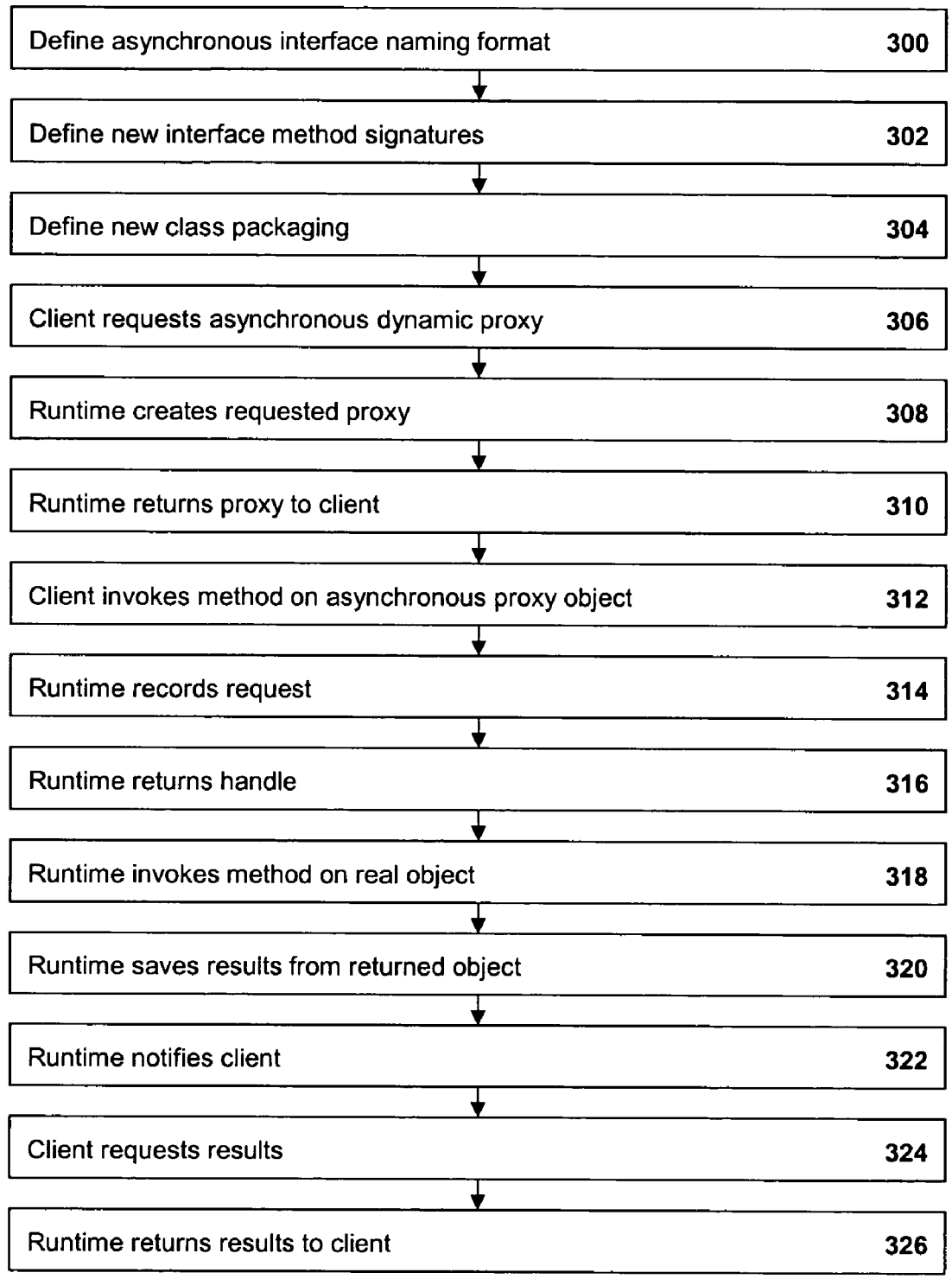
FIG. 3 is a flow chart of an asynchronous method call of the present invention.

The present invention will now be described with reference to the flow chart of FIG. 3. Before the client 10 may request and invoke an asynchronous dynamic proxy, three rules are defined by the runtime. First, the runtime defines a format by which the asynchronous interface is named (step 300). The format enables the asynchronous interface name to be unambiguously derived from the original interface name and the original interface name to be unambiguously derived from the asynchronous interface name. In one such format, a predetermined keyword may be added to the original interface name. For example, if the original interface name is 'com.mycompany.mypackage.MyInterface' and the keyword to be added is 'Async'', the new interface name becomes 'com.mycompany.mypackage.MyInterfaceAsync'. In another such format, the original interface name and the corresponding new interface name may be stored in a mapping or lookup table. When the original interface name is invoked, it is mapped through the table to the new name.

A second rule defined by the runtime changes the interface method signature (step 302). Although the asynchronous interface retains all of the methods from the original interface, the method signatures are changed to return a correlator object (handle) to the client. The client may later use the handle to query the runtime for results. A coded example is as follows:

```
public interface MyInterface {
    public int getValue( );
    public void doStuff( ) throws Exception;
}
is changed in the new Asynchronous interface to
    public interface MyInterfaceAsync {
// Note the change in the return type of method signature from above
    public Handle getValue( );
    public Handle doStuff( ) throws Exception;
}
```

The third rule pertains to packaging (step 304). The client is to define a new interface class which will not have any name collisions with existing classes, and will be loaded by the classloader consistent with the original class. For example, the new class may be defined in the same package as the original interface, and must be available in the classloader's classpath at runtime. For example, if the original interface exists in package as my.package.MyInterface, the asynchronous interface class must exist in the same package as my.package.MyInterfaceAsync. This new class should be packaged similar to how the original interface class is packaged in a Jar file. As an example, if the original interface exists in a package as my.package.MyInterface, the asynchronous interface class may exist in the same package as my.package.MyInterfaceAsync. The new class may be packaged similar to the manner in which the original interface class is packaged in a Jar file.

Figure 4:
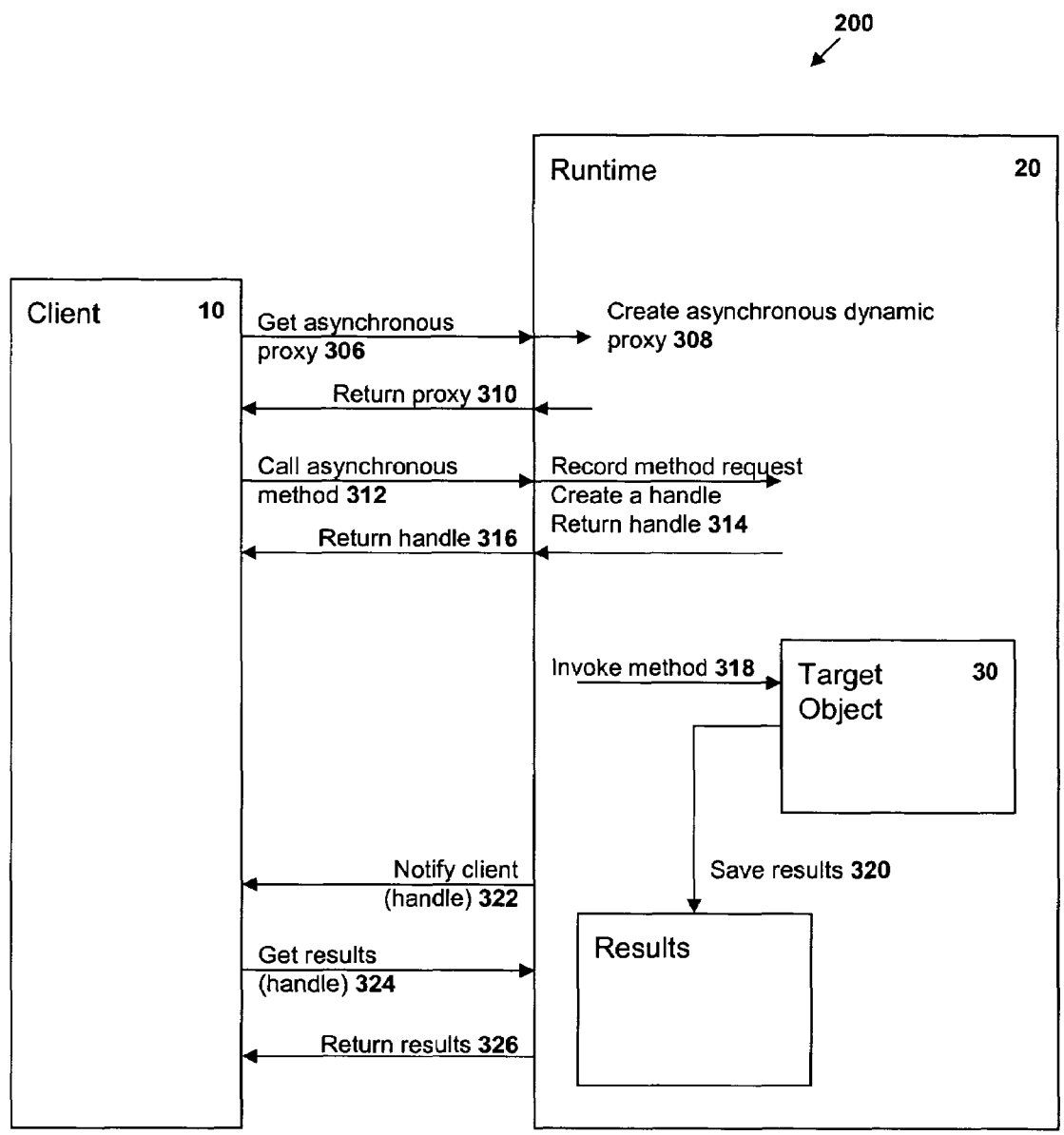
FIG. 4 is a process diagram of an asynchronous method call of the present invention.

Referring now also to the process diagram of FIG. 4, after the rules have been defined, the client may request the runtime for an asynchronous dynamic proxy for a specified synchronous real interface (step 306). Upon receipt of the request, the runtime creates the proxy (step 308) and returns it to the client (step 310). Based on the predefined rules, the runtime now "knows" the relationship between the asynchronous proxy and the corresponding synchronous proxy. Subsequently, the client may invoke methods on the asynchronous proxy object through a call to the runtime (step 312). In response, the runtime records the method request (step 314) and creates and returns a handle to the client (step 316). The runtime then invokes the method on the real target object 30 (step 318).

At any time after receiving the handle from the runtime (in step 316), the client may invoke other methods or initiate or complete other processes, without having to wait for results to be returned from the runtime. Additionally, the client may use the handle to query the runtime as to the status of the original call. When the runtime receives results back from the target object 30, the results are saved (step 320). In response to a query by the client in which the handle is used, the runtime notifies the client that the results are available (step 322). The client then requests the results (324) and the runtime returns them to the client (326). It will be appreciated that the runtime may be programmed to notify the client automatically when results are returned from the target object rather than wait for the client to send a query.

The following is an exemplary coding of the creation and invoking of an asynchronous proxy interface according to the present invention:

```
Service Interface:
    // Asynch Interface
    package my.example.package;
    public interface originalInterfaceAsync {
        public Handle getValue( );
        public Handle foo( ) throws Exception;
    }
Client invokes the target object methods asynchronously as follows:
    OriginalInterfaceAsync proxyAsync =
    OriginalInterfaceAsync)Proxy.newProxyInstanceAsync(classLoader,
        originalInterface.class, invocationHandler);
    Handle asyncHandle = proxyAsync.getValue( );
    // returns immediately
    // Runtime saves the original request and the associated
        Handler for future use.
    // do some useful work now
    ...
    // wait for invocation to complete and examine results
    Proxy.waitForCompletion(handle); // this call blocks until
        signaled by Runtime that the method is invoked.
    // Obtain results of invocation
    int value = ((Integer)Proxy.getResult(handle).intValue( );
```

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method, executing within a computer system having at least one processor, for asynchronously invoking a dynamic proxy method, comprising:
   establishing a set of rules to enable a client to define an asynchronous interface;
   in response to a request from the client, creating an asynchronous proxy for a specified interface;
   returning the dynamic asynchronous proxy to the client in response to the client making a method request for a requested method by making an asynchronous method call on the dynamic asynchronous proxy:
      recording the method request;
      creating a handle; and
      returning the handle to the client, whereby the client is permitted to perform other functions after invoking the asynchronous method call and before receiving results;
   invoking the requested method;
   storing the results of the requested method after it is invoked; and
   in response to a query from the client, returning the stored results to the client.

2. The method of claim 1, wherein establishing the set of rules comprises:
   establishing an asynchronous interface naming protocol;
   establishing an interface method signature; and
   establishing a class packaging protocol.

3. The method of claim 2, wherein establishing the asynchronous interface naming protocol comprises requiring the client to add a predetermined keyword to an original name of the specified interface.

4. The method of claim 2, wherein establishing the asynchronous interface naming protocol comprises mapping an original name of the specified interface to a new interface name.

5. The method of claim 2, wherein establishing an interface method signature comprises requiring the client to change the method signature to return a correlator handle to the client.

6. The method of claim 2, wherein establishing a class packaging protocol comprises requiring the client to define a new class in a same package as the specified interface.

7. The method of claim 1, further comprising transmitting a notice to the client that the results are available.

8. A method, executing within a computer system having at least one processor, for asynchronously calling a dynamic proxy method, comprising:

creating a request for a dynamic asynchronous proxy for a specified interface;

transmitting the request to a Java runtime environment from outside of the Java runtime environment;

receiving the dynamic asynchronous proxy from the Java runtime environment;

making a call by calling an asynchronous method on the dynamic asynchronous proxy;

receiving a return handle from the Java runtime environment;

employing the handle to query the Java runtime environment on the status of the call; and fetching results of the call if the results have been returned to the Java runtime environment.

9. The method of claim 8, wherein the request comprises adding a predetermined keyword to an original name of the specified interface.

10. The method of claim 8, wherein creating the request comprises changing the method signature to return a correlator to handle the client.

11. The method of claim 8, wherein creating the request comprises defining a new class in a same package as the specified interface.

12. The method of claim 8, further comprising receiving a notice from the runtime that the results are available.

13. The method of claim 8, further comprising performing other functions after receiving the return handle and before fetching the results.

* * * * *